United States Patent [19]

Shin

[11] Patent Number: 5,022,604
[45] Date of Patent: Jun. 11, 1991

[54] REEL SERVO DEVICE FOR VIDEO CASSETTE RECORDER IN DIRECT DRIVE REEL SYSTEM

[75] Inventor: Jae H. Shin, Seoul, Rep. of Korea

[73] Assignee: Goldstar Co., Ltd., Seoul, Rep. of Korea

[21] Appl. No.: 285,297

[22] Filed: Dec. 15, 1988

Related U.S. Application Data

[63] Continuation of Ser. No. 41,238, Apr. 22, 1987, abandoned.

[30] Foreign Application Priority Data

Apr. 22, 1986 [KR] Rep. of Korea ............... 5437/1986

[51] Int. Cl.$^5$ .................................... B65H 16/10
[52] U.S. Cl. ..................... 242/203; 242/75.51; 318/7; 352/14; 352/180
[58] Field of Search ............. 242/75.51, 203, 202, 242/201, 186, 45; 318/6, 7; 360/71, 73; 352/14, 180; 226/16, 42

[56] References Cited

U.S. PATENT DOCUMENTS

| | | | |
|---|---|---|---|
| 1,851,760 | 3/1932 | Ellis | 242/75.51 X |
| 3,079,538 | 2/1963 | Yamashita | 242/75.51 X |
| 3,733,529 | 5/1973 | Ross et al. | 242/203 X |
| 3,746,278 | 7/1973 | Dennis et al. | 318/7 X |
| 3,841,583 | 10/1974 | Kawa | 242/201 X |
| 4,012,674 | 3/1977 | Spitsbergen et al. | 318/7 |
| 4,065,074 | 12/1977 | Anderson et al. | 242/75.51 X |
| 4,357,560 | 11/1982 | Woo et al. | 318/7 |
| 4,363,457 | 12/1982 | Flint et al. | 242/203 |
| 4,377,777 | 3/1983 | Asagi et al. | 318/7 X |
| 4,448,368 | 5/1984 | Skalko | 242/75.51 X |
| 4,540,920 | 9/1985 | Cutler et al. | 242/75.46 X |

Primary Examiner—Joseph J. Hail, III

[57] ABSTRACT

A reel servo device for a video cassette recorder with a direct drive reel system, which carries out smoothly fast forward and fast rewind operations by distributing properly the load carried to the supply reel motor and the take-up reel motor. The current through the driving reel motor, is detected and supplied as a driving current of a magnitude proportional to the detected voltage to the other reel motor so as to rotate it in the direction of the tape movement.

3 Claims, 3 Drawing Sheets

REEL SERVO DEVICE FOR VIDEO CASSETTE RECORDER IN DIRECT DRIVE REEL SYSTEM

This application is a continuation, of application Ser. No. 07/041,238 filed on Apr. 22, 1987, now abandoned.

BACKGROUND OF THE INVENTION

The present invention relates to a reel servo device for video cassette recorders with direct drive reel systems, particularly a reel servo device for video cassette recorders to carry out smoothly fast forward and fast rewind operations by distributing properly the loads of both the supply reel motor and the take-up reel motor in cases of operating the fast forward and the fast rewind modes.

According to a video cassette recorder of the direct drive reel system, the fast forward and the fast rewind operations are performed by driving the take-up reel motor at the time of the fast forward, and by driving the supply reel motor at the time of the fast rewind.

Thus, the conventional device has disadvantages in that as the fast forward or the fast rewind proceeds, the tape is taken up on the take-up reel or the supply reel so disproportionately that the load of the take-up reel motor or supply reel motor is keep rising and excessive electric current flows in the motor. The useful life of both reel motors is accordingly reduced, and since an immoderate force is applied to the tape, which is a recording medium, the tape is damaged.

OBJECTS OF THE INVENTION

It is the one object of the invention to provide a reel servo device preventing an overload from being applied to the take-up reel motor or the supply reel motor at the time of the fast forward or the fast rewind operation so as not to allow excessive current to flow to the take-up reel motor or the supply reel motor.

It is another object of the invention to provide a reel servo device to prevent any damage to the tape in such a way that immoderate force is not applied to the tape which is a magnetic recording medium, and to carry out thereby smoothly the fast forward or the fast rewind operations.

These objects are attained according to the invention by detecting the current flowing through the take-up reel motor or the supply reel motor in the course of fast forwarding or fast rewinding, causing a current of magnitude proportional to the detected voltage to flow through the supply reel motor respectively or take-up reel motor, and rotating the supply reel motor or take-up reel motor in the unwinding direction of the tape.

BRIEF DESCRIPTION OF THE DRAWINGS

Embodiments of the invention will now be described in more detail, by way of example, with reference to the accompanying drawings. In the drawings.

DESCRIPTION OF THE PREFERRED EMBODIMENT

Figure 1:
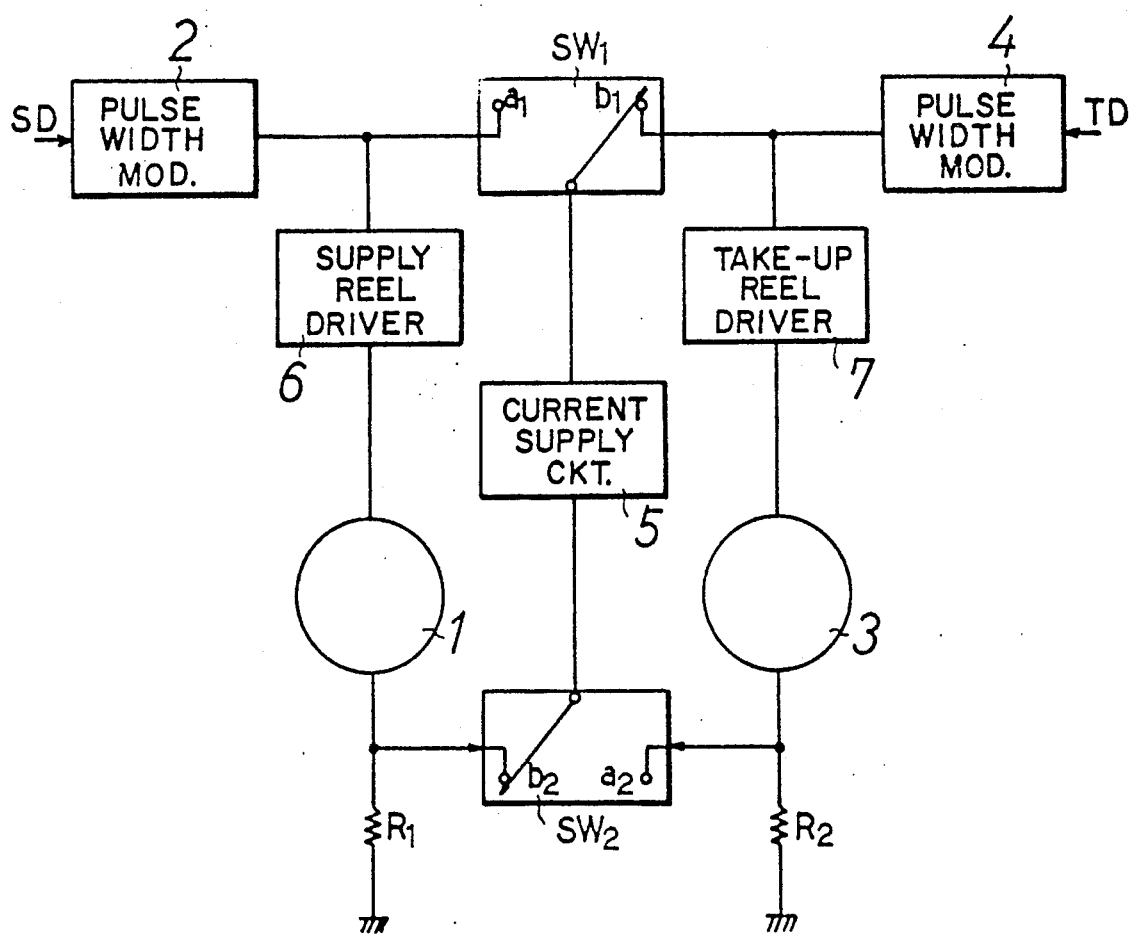
FIG. 1 is a block diagram of the reel servo device for a video cassette recorder according to the invention.

As shown in FIG. 1, the reel servo device of the direct drive reel system provides an output signal of a supply pulse width modulator 2 which is driven by a supply driving signal SD. The output signal is applied to the supply reel motor driving part to 6, which causes the supply reel motor 1 to rotates forward (in the winding direction of the tape on the supply reel) to carry out a fast rewind, operation while as output signal of the take-up pulse width modulator 4, driven by the take-up drive signal TD is applied to the take-up reel motor driving part 7, the take-up reel motor 3 rotates forward (in the winding direction of a tape on the take-up reel) to carry out the fast forward operation. Resistances $R_1$, $R_2$ are connected to the supply reel motor 1 and the take-up reel motor 3, respectively, and the contact points are connected to fixed terminals $b_2$, $a_2$ of the switch $SW_2$. Switch $SW_2$ is connected to the moving terminal of the switch $SW_1$ through a current supply part 5; the fixed terminals $a_1$, $b_1$ of the switch $SW_1$ are connected to the supply reel motor driving part 6 and the take-up reel motor driving part 7, respectively, wherein the said switches $SW_1$, $SW_2$ are interlocking with each other, are short-circuited to the fixed terminals $a_1$, $a_2$ at the moment the fast forward mode is selected, and are short-circuited to the fixed terminals $b_1$, $b_2$ at the moment the fast rewind mode is selected.

Figure 2:
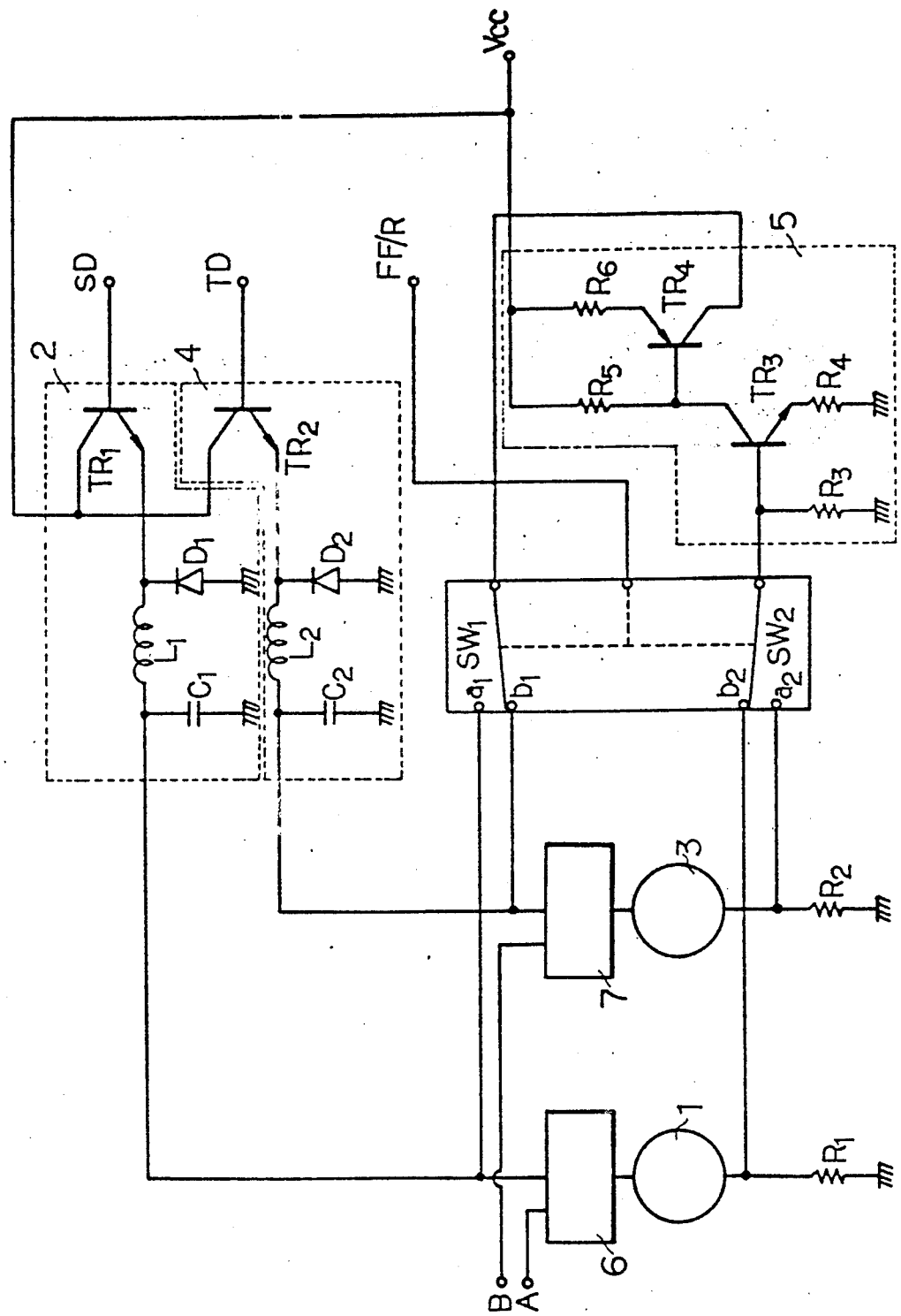
FIG. 2 is a detailed circuit diagram of the embodiment shown in FIG. 1.
Figure 3:
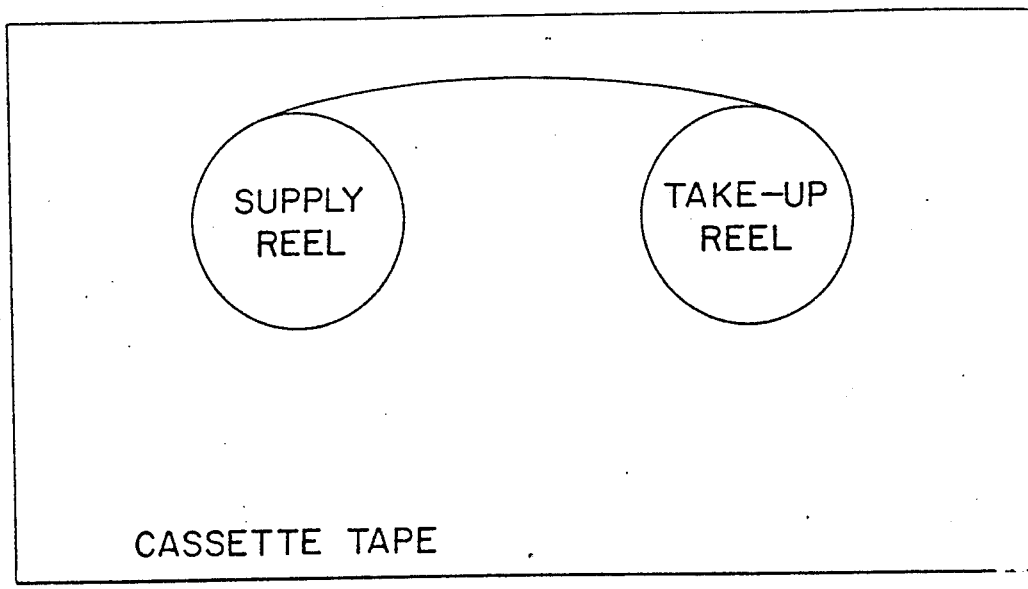
FIG. 3 shows a cassette tape with supply reel and take-up reel.

As shown in FIG. 2, which is a detailed circuit diagram of the embodiment described in FIG. 1, the supply pulse width modulator 2 comprises transistor $TR_1$, diode $D_1$, coil $L_1$ and condenser $C_1$; the take-up pulse width modulator 4 comprises transistor $TR_2$, diode $D_2$, coil $L_2$ condenser $C_2$; and the current supply part 5 comprises resistances $R_3$–$R_6$ and transistors $Tr_3$, $Tr_4$.

The supply reel motor driving part 6 and the take-up reel motor driving part 7 determine the rotating direction of the supply reel motor 1 and the take-up reel motor 2 by means of drive control signals A, B output by a separate microprocessor. That is to say, in the fast forward mode, the drive control signal A is at a low potential state and the drive control signal B is at a high potential state so that the supply reel motor driving part 6 the supply reel motor 1 backward and the take-up reel motor driving part 7 the take-up reel motor 3 forward, while in the fast rewind mode, the drive control signals A and B are at a high potential state and a low potential state, respectively, so that the supply reel motor driving part 6 and the take-up reel motor driving part 7 turn so as to rotate the supply reel motor forward and to rotate the take-up reel motor 3 backward, respectively; The operational effect of the invention will now be described in detail.

When the fast mode is selected, as shown in FIG. 2, the switches $SW_1$, $SW_2$ are short-circuited to the fixed terminals $b_1$, $b_2$, respectively, the supply reel motor driving part 6 turns so as to rotate forward the supply reel motor 1, and the take-up reel motor driving part 7 turns so as to rotate backward the take-up reel motor 3. Consequently, at this time the output signal of the supply pulse width modulator 2 operated by the supply driving signal SD rotates forward the supply reel motor 1 through the supply reel motor driving part 6 to carry out the fast rewind.

However, since the current flowing through the supply reel motor 1 flows at this time to ground through the resistance $R_1$, the voltage proportional to the current is detected and output at the resistance $R_1$, the detected voltage is applied to the base of transistor $TR_3$ of the current supply part 5 through the fixed terminal $b_2$ of the switch $SW_2$ so that the conductivity of transistor $TR_3$ varies depending on the magnitude of such detected voltage, and the conductivity of transistor TR$_4$ varies also in proportion to the deleted voltage magnitude. Thus, the current is output to the collector of transistor TR$_4$ of the current supply part 5 in proportion to the voltage detected at the resistance R$_1$. The collector output current of the transistor TR$_4$ is supplied as a driving current to the take-up reel motor driving part 7 through the fixed terminal b$_1$ of the switch SW$_1$ so that the take-up reel motor 3 rotates backward to unwind the tape. Since the load carried to the supply reel motor 1 is reduced relatively, the fast rewind is carried out smoothly.

On the other hand, when the fast forward mode is selected, the switches SW$_1$, SW$_2$ are short-circuited to the fixed terminals a$_1$, a$_2$, respectively, and the supply reel motor driving part 6 and the take-up reel motor driving part 7 turn so as to rotate backward and forward the supply reel motor 1 and the take-up reel motor 3, respectively, so that the take-up reel motor 3 is rotated forward by the output signal of the take-up pulse width modulator 4 operated by the take-up driving signal TD to carry out the fast forward. At this time, the current flowing through the take-up reel motor 3 is detected as a voltage across the resistance R$_2$ in the same way as described above, and then applied to the base of transistor TR$_3$ of the current supply part 5 through the fixed terminal a$_2$ of the switch SW$_2$ so that the current propportional to the magnitude of the detected voltage is output to the collector of transistor TR$_4$. Since the collector output current of transistor TR$_4$ is applied as a driving current to the supply reel motor driving part 6 through the fixed terminal a$_1$ of the switch SW$_1$ and rotates backward the supply reel motor 1, backward the tape is freely unwound from the supply reel. Consequently the load carried by the take-up reel motor 3 is reduced relatively to carry out the fast forward smoothly.

As described above in detail, the invention has the effect of protecting the reel motors by distributing the load so as to be carried proportionately between both reel motors at the time of the fast forward and the fast rewind operations, and by preventing excessive current from flowing through the reel motors; to carry out smoothly and softly the fast forward and the fast rewind operations; to protect the tape by reducing the excessive force applied to the tape at the end of the fast forward; to cut down consumption of the electric power through a proper distribution of the load; and to reduce the noise produced by a large change in the load.

I claim:

1. A reel servo device for a video cassette recoder having a supply reel and take-up reel with a direct drive reel system, comprising:
   a supply reel motor for driving the supply reel of the video cassette;
   a take-up reel motor for driving the take-up reel of the video cassette;
   supply reel motor driving means for driving said supply reel motor in response to a supply reel drive signal, said supply reel drive signal causing a rewind operation;
   take-up reel motor driving means for driving said take-up reel motor in response to a take-up reel drive signal, said-take-up reel drive signal causing a fast forward operation;
   drive control signal means for setting a first direction of rotation of said supply and take-up reel motors when rewinding and for setting a second direction of rotation when fast forwarding;
   detecting means for detecting an amount of current flowing through a driven motor and producing a detection signal corresponding thereto;
   generating means for producing an output current signal proportional to said detection signal; and
   switching means for applying said output current signal to the reel motor driving means of a non-driven motor to drive said non-driven motor with a current proportional to said output current signal, thereby evenly distributing an increased load between said supply reel motor and said take-up reel motor and preventing excessive current flow through said supply reel motor and said take-up reel motor.

2. The reel servo device defined in claim 1, wherein said supply and take-up reel motor driving means comprise pulse width modulators.

3. The reel servo device defined in claim 1, wherein said means for detecting comprises resistance means for detecting the current flowing through said motors.

* * * * *